United States Patent
Phadnis et al.

(10) Patent No.: US 8,156,209 B1
(45) Date of Patent: Apr. 10, 2012

(54) AGGREGATION DEVICES PROCESSING KEEP-ALIVE MESSAGES OF POINT-TO-POINT SESSIONS

(75) Inventors: Amit Phadnis, Karnataka (IN); Pankaj Vyas, Karnataka (IN); Chandrahasa Chakravarthi Pullagura, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 2426 days.

(21) Appl. No.: 09/785,884

(22) Filed: Feb. 15, 2001

(51) Int. Cl.
*G06F 15/173* (2006.01)

(52) U.S. Cl. ........ 709/223; 709/224; 709/226; 709/228; 709/227; 709/229

(58) Field of Classification Search .......... 709/223–229, 709/220
See application file for complete search history.

(56) References Cited

U.S. PATENT DOCUMENTS

| | | | | |
|---|---|---|---|---|
| 5,265,092 A | * | 11/1993 | Soloway et al. | 370/238 |
| 5,535,335 A | * | 7/1996 | Cox et al. | 709/224 |
| 5,781,726 A | * | 7/1998 | Pereira | 709/200 |
| 5,964,837 A | * | 10/1999 | Chao et al. | 709/224 |
| 6,105,064 A | * | 8/2000 | Davis et al. | 709/224 |
| 6,252,878 B1 | * | 6/2001 | Locklear et al. | 370/401 |
| 6,304,546 B1 | * | 10/2001 | Natarajan et al. | 370/216 |
| 6,311,206 B1 | * | 10/2001 | Malkin et al. | 709/224 |
| 6,412,007 B1 | * | 6/2002 | Bui et al. | 709/227 |
| 6,418,469 B1 | * | 7/2002 | Justice et al. | 709/224 |
| 6,449,279 B1 | * | 9/2002 | Belser et al. | 370/397 |
| 6,466,985 B1 | * | 10/2002 | Goyal et al. | 709/238 |
| 6,542,504 B1 | * | 4/2003 | Mahler et al. | 709/247 |
| 6,629,163 B1 | * | 9/2003 | Balassanian | 710/33 |
| 6,643,289 B1 | * | 11/2003 | Natanson et al. | 709/223 |
| 6,717,914 B1 | * | 4/2004 | Hamami | 370/248 |
| 6,721,334 B1 | * | 4/2004 | Ketcham | 370/473 |
| 6,775,709 B1 | * | 8/2004 | Elliott | 709/238 |
| 6,779,039 B1 | * | 8/2004 | Bommareddy et al. | 709/226 |
| 6,798,739 B1 | * | 9/2004 | Lee | 370/216 |
| 6,901,079 B1 | * | 5/2005 | Phadnis et al. | 370/466 |
| 6,981,064 B1 | * | 12/2005 | Phadnis et al. | 709/250 |
| 6,993,325 B1 | * | 1/2006 | Waesterlid | 455/414.1 |
| 6,999,411 B1 | * | 2/2006 | Brewer et al. | 370/220 |
| 7,002,993 B1 | * | 2/2006 | Mohaban et al. | 370/471 |
| 7,616,646 B1 | * | 11/2009 | Ma et al. | 370/401 |
| 2002/0075303 A1 | * | 6/2002 | Thompson et al. | 345/751 |

OTHER PUBLICATIONS

Simpson, W., "RFC 1661: Point-to-Point Protocol," www.ietf.org, Jul. 1994.*
"Multiplexed Packet Switching," Newton's Telecom Dictionary, Harry Newton, Feb. 2002, p. 490.*
Rosenberg et al., "An RTP Payload Format for User Multiplexing," IETF Internet Draft, May 1998, 10 pages, linked at http://tools.ietf.org/html/draft-ietf-avt-aggregation-00.txt.*
W. Simpson; Entitled, "Request for Comments: 1661—Point to Point Protocol"; Available from www.ietf.org; Jul. 1994; 54 Pages.
Townsley et al.; Request for Comments: 2661—Layer Two Tunneling Protocol "L2TP" ; Available from www.ietf.org; Aug. 1999; 80 Pages.

* cited by examiner

*Primary Examiner* — Dohm Chankong
(74) *Attorney, Agent, or Firm* — Patent Capital Group (57) ABSTRACT

Several keep-alive messages of point to point (PPP) sessions received from a remote system are aggregated into a single packet in an aggregation device (e.g., network access server). The aggregated packet is sent to a peer aggregation device (e.g., home gateway) at the other end of the PPP session. The peer aggregation device may send the status of the sessions in a single packet. As a result, the data traffic on a communication backbone due to keep-alive status checks may be reduced. Without waiting for the peer aggregation device to provide the status information, a proxy reply may be generated from the aggregation device.

53 Claims, 5 Drawing Sheets

AGGREGATION DEVICES PROCESSING KEEP-ALIVE MESSAGES OF POINT-TO-POINT SESSIONS

BACKGROUND OF THE INVENTION

1. Field of the Invention

The present invention relates to communication networks, and more specifically to a method and apparatus for supporting keep-alive messages of point-to-point sessions in aggregation devices (e.g., network access servers and home gateways).

2. Related Art

Point-to-point sessions ("PPP sessions") are often set up between remote systems (e.g., personal computer systems at homes) and communication networks. A PPP session generally allows data transfer between a remote system and a termination device situated at the edge of a communication network. The termination device usually provides additional communication to enable a remote system (at one end of a session) to communicate with a target host as is also well known in the relevant arts. The communication between a host and a remote system forms the basis for several user applications.

Point-to-point protocol (PPP) described in request for comment (RFC) 1661, available from www.ietf.org, is a common protocol for establishing point-to-point sessions. As described in RFC 1661, communication networks may be implemented using transport protocols such as Internet Protocol, ATM and/or Frame Relay. As the host systems and remote systems are at either end of corresponding applications, the two systems are commonly referred to as end systems.

End systems send and receive data from aggregation devices, which are located at the edge of communication networks. The aggregation devices which are close to the remote systems may be referred to as network access servers (NAS) and the devices which are close to the host are referred to as home gateways. In general, an aggregation device serves as a common node in the path of several sessions, and interfaces with the corresponding (close) end systems.

An end system may send a keep-alive message typically to check the status of the end to end connection supporting a session. For example, in the case of extended period of inactivity on a session, an end system may wish to check whether the inactivity is due to outage in the underlying connection path or merely due to the inherent operation of applications using the session. If the keep alive message is not received back, the end system may release the session, thereby releasing resources such as session related queues and other memory entries in devices in the session path. Such release typically leads to more optimal use of the resources in networks.

In one prior system, an aggregation device forwards each received keep alive message to the other ("peer") aggregation device at the edge of the communication network. The other aggregation device responds back indicating the status of the tunnel. The status information may be communicated to the end system originating the keep-alive message.

One problem with such a prior system is that a network may support many sessions, and the keep-alive data transfers may consume an undesirable amount of available bandwidth on the network. As a result, the prior art approach may be unacceptable at least in some environments. Accordingly, what is needed is a method and apparatus which allows the bandwidth on the network to be optimally used while potentially continuing support for the end systems in relation to keep alive messages.

SUMMARY OF THE INVENTION

The present invention minimizes the overhead on a communication network caused by processing keep-alive status messages by aggregating several such messages into a single packet ("aggregated request packet"), and transmitting the single packet on the communication network. A reply message ("aggregated reply packet") received on the communication network may also contain the status of multiple sessions, thereby further reducing the data overhead.

In an embodiment, an aggregation device contains a keep alive processor which processes all the messages related to the keep-alive message processing. The keep alive processor passes all the keep-alive messages received from end systems to a message aggregator. The message aggregator aggregates the messages into a single aggregated request packet and sends the packet to a peer aggregation device. Only messages related to sessions terminating on the same peer aggregation device may be aggregated into a single packet such that only peer aggregation devices may need to be modified to operate in accordance with the present invention.

The aggregation device may also contain a de-aggregator which receives a aggregate reply packet (from a peer aggregation device) containing the status information of several sessions. The de-aggregator may update the information in a remote status table. The replies to the end system may be based on the information on the remote status table.

According to another aspect of the present invention, an aggregation device may contain proxy server which sends a status reply message without waiting for the aggregated reply packet from the peer aggregation device. The proxy server may further send a status reply message indicating that the session status is alive/OK when a first keep-alive message is received for the session. Accordingly, the information in the remote status table may be initialized to indicate that the session is alive/OK when the session is set up.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aggregation device in accordance with the present invention aggregates several keep-alive messages of different sessions into a single packet ("aggregated request packet"), and transmits the single packet. The aggregation device at the other end of the session may receive the single packet and generate a single keep alive reply packet ("aggregated reply packet") indicating the status of all the requested sessions. Due to the aggregation, the data related to keep-alive messages and/or replies may be minimized, and more bandwidth may be available for the data related to user applications executing on end systems.

The invention is described below with reference to an example environment for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention. Furthermore the invention can be implemented in other environments.

2. Example Environment

Figure 1:
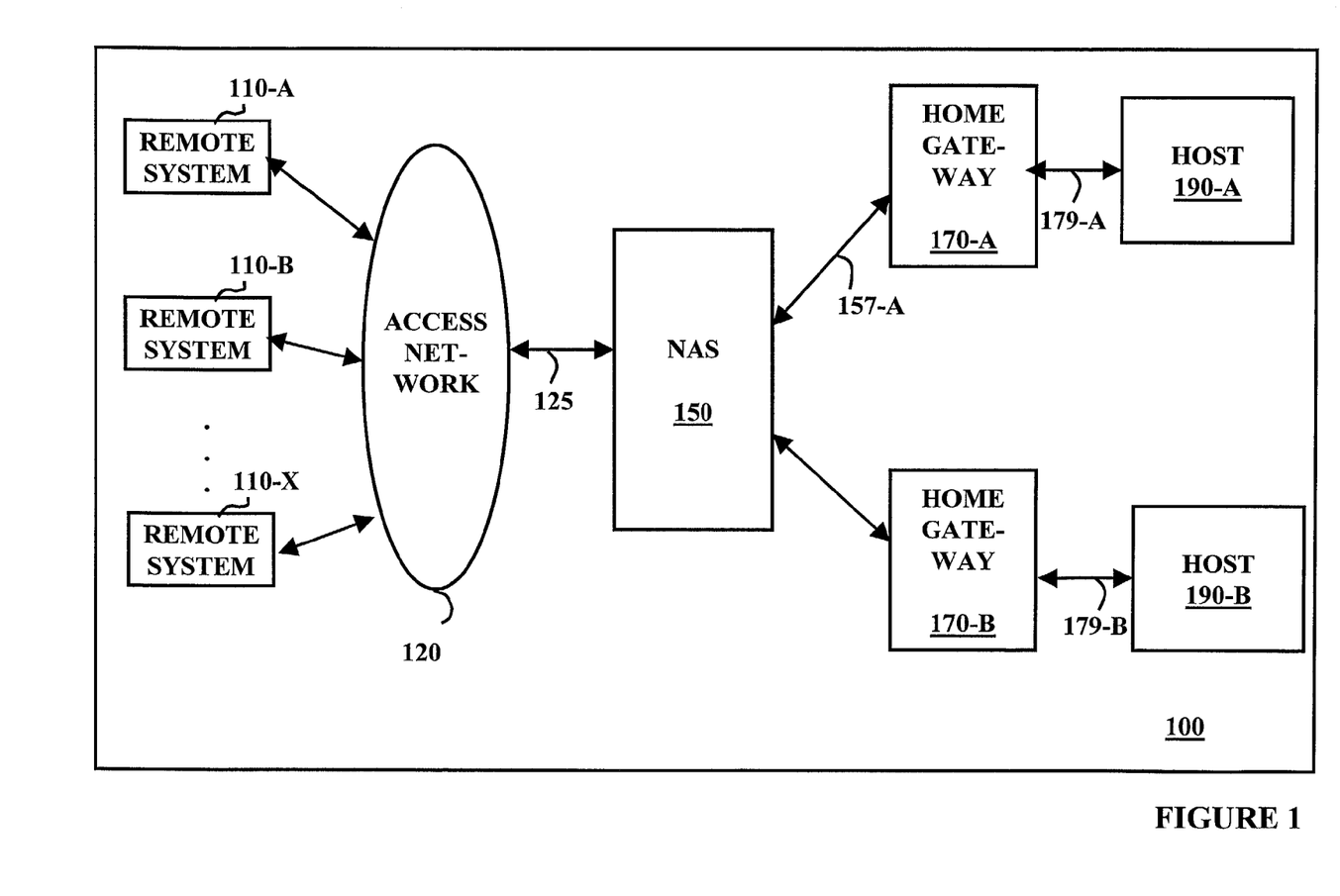
FIG. 1 is a block diagram illustrating an example communication environment in which the present invention can be implemented.

FIG. 1 is a block diagram illustrating an example communication environment 100 in which the present invention can be implemented. Communication environment 100 is shown containing remote systems 110-A through 110-X, access network 120, network access server (NAS) 150, home gateways 170-A and 170-B, and hosts 190-A and 190-B. Each system is described below in further detail.

Remote systems 110-A through 110-X are used by subscribers (or end users) to access hosts (e.g., 190-A) of interest. Devices commonly known as customer premise equipment (CPE) and computer systems with modems are examples of remote systems 110-A through 110-X. Each remote system 110-A through 110-X may access a desired host 190-A or 190-B. Only a few representative remote systems and hosts are included in FIG. 1 for illustration. Typical environments contain many more systems in reality.

Access network 120 provides the electrical and physical interface consistent with the technology (e.g., remote access, Digital Subscriber Line) used by the corresponding remote system. In general, access network 120 enables a point to point session to be set up between each remote system and NAS 150.

Network access server (NAS) 150 and home gateways 170-A and 170-B (aggregation devices in general) may be implemented for implementation of tunnels on backbone path 157-A. The aggregation devices may also serve as termination points of PPP sessions as is well known in the relevant arts. Backbone path 157-A may contain several intermediate devices (not shown) and can be implemented in a known way. In general, NAS 150 and home gateways 170-A and 170-B support sessions provided using backbone path 157-A.

While supporting sessions, the aggregation devices may receive keep alive messages from the corresponding end systems. The manner in which the messages may be processed in accordance with several aspects of the invention is described below in further detail.

3. Method

Figure 2:
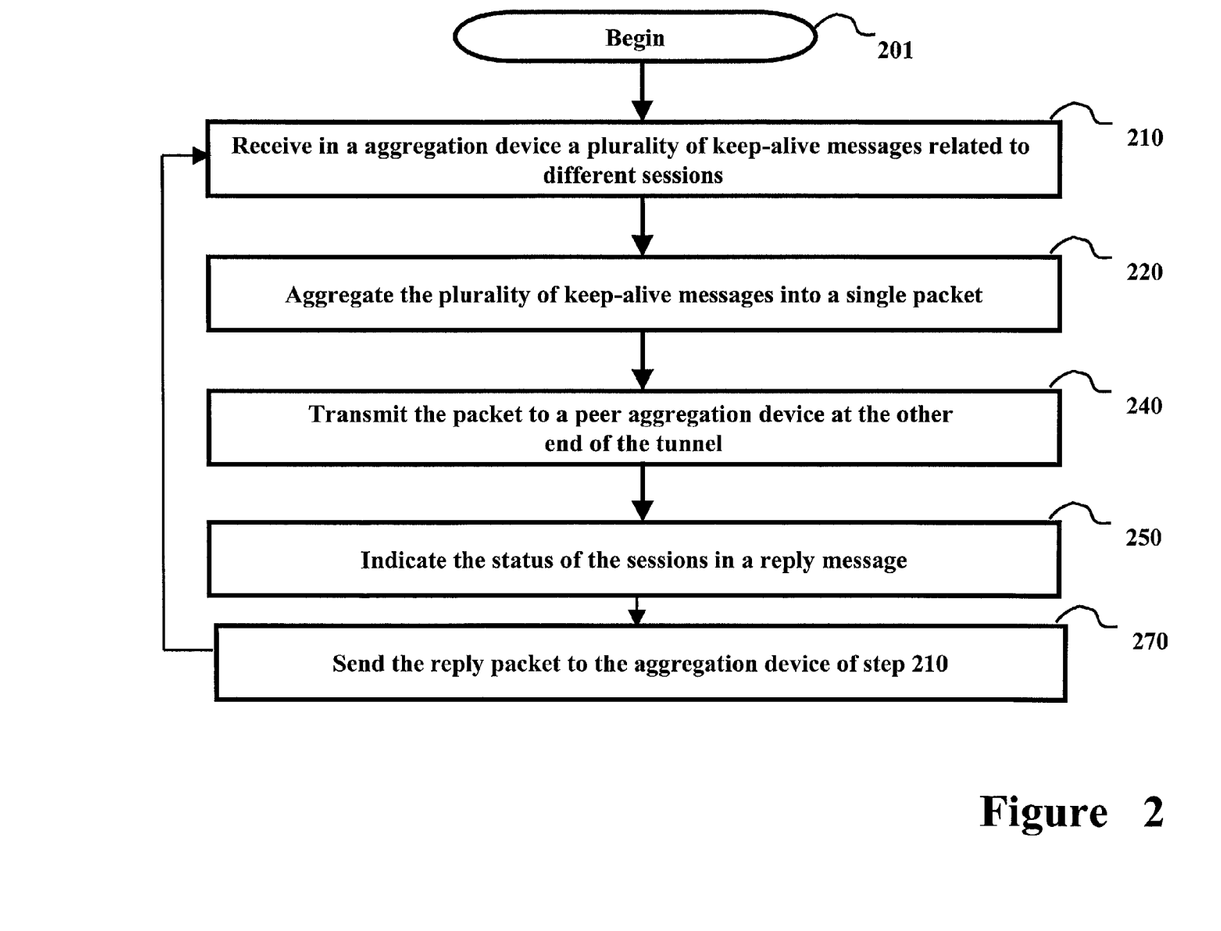
FIG. 2 is a flow chart illustrating a method in accordance with the present invention.

FIG. 2 is a flow chart depicting a method in accordance with the present invention. The method is described with reference to FIG. 1 for illustration. However, the method may be performed in other environments also. The method starts in step 201, in which control immediately passes to step 210.

In step 210, NAS 150 receives a plurality of keep-alive messages from different remote systems (110-A through 110-X) related to different sessions. In step 220, NAS 150 aggregates the messages into a single packet ("aggregated request packet") suitable for transmission on backbone path 157-A. The packet can be generated in any format, but needs to be consistent with the implementation of home gateway 170-A.

In step 240, NAS 150 transmits the aggregated request packet to home gateway 170-A (peer aggregation device) on path 157-A. In an embodiment described below, NAS 150 transmits a packet covering the keep-alive messages received in each of a successive time periods (e.g., 10 seconds).

In step 250, home gateway 170-A receives the packet and generates an aggregated reply packet indicating the status of the sessions requested by the packet generated in step 220. The reply packet also can be of any format, but needs to be consistent with the implementation of NAS 150. In step 270, the packet is transmitted to NAS 150. Control then passes to step 210, in which NAS 150 continues to monitor for more arriving keep-alive messages.

Thus, the method of FIG. 2 enables aggregation devices to check the status of the sessions while causing minimal traffic overhead on backbone path 157-A. An example packet format used by NAS 150 and home gateway 170-A is described next.

4. Packet Format

An example format of a packet consistent with PPP protocol is indicated below. Further details of the format and specific values are described in RFCs 1661 and 2661, which are both incorporated in their entirety herewith into the present application.

Byte 1: Indicates the protocol within PPP. The value may be set to PPP_LCP (link control protocol).

Byte 2: Indicates a code within the PPP protocol. According to an aspect of the present invention, the value is set to 12, a new value not specified by the RFCs.

Byte 3: Indicates the type of the keep-alive packet. A value of 1 may be used to indicate keep-alive requests and 2 to indicate keep-alive responses.

Byte 4: Indicates count, which is the number of keep-alive messages or responses being aggregated in the present packet.

Bytes 5 Onwards: Number of sets equal to count, with each set containing MID field, aggregation device magic number, Client Magic number and a status. The four fields are described below in further detail.

MID (2 Bytes): MID is a L2F session identifier corresponding to the PPP session. MID may be negotiated when the session is set up in a known way.

Aggregation Device Magic Number (2 bytes): In the packet transmitted from NAS 150, the field corresponds to a magic number maintained in NAS 150 for the session to which the triplet relates. In the packet transmitted from home gateway 170-A, the field corresponds to a magic number maintained in home gateway 170-A for the session to which the triplet relates to. Magic numbers are described below in further detail.

Client Magic Number (2 bytes): A magic number for the session maintained at remote system originating the session status request in the packet sent by NAS 150. In the packet received from home gateway 170-A, the field may be set by home gateway 170-A.

Status: A bit which is set by home gateway 170-A to one logical value to indicate that the status is alive/OK and to another logical value to indicate that the status is not alive/OK.

In general, magic numbers are unique numbers used to ensure that no loops are present in the communication. Magic numbers are described in further detail in RFC 1661, which is incorporated in its entirety herewith. Embodiments of NAS 150 and home gateway 170-A which implement the features described above are described next.

5. Network Access Server (NAS)

Figure 3:
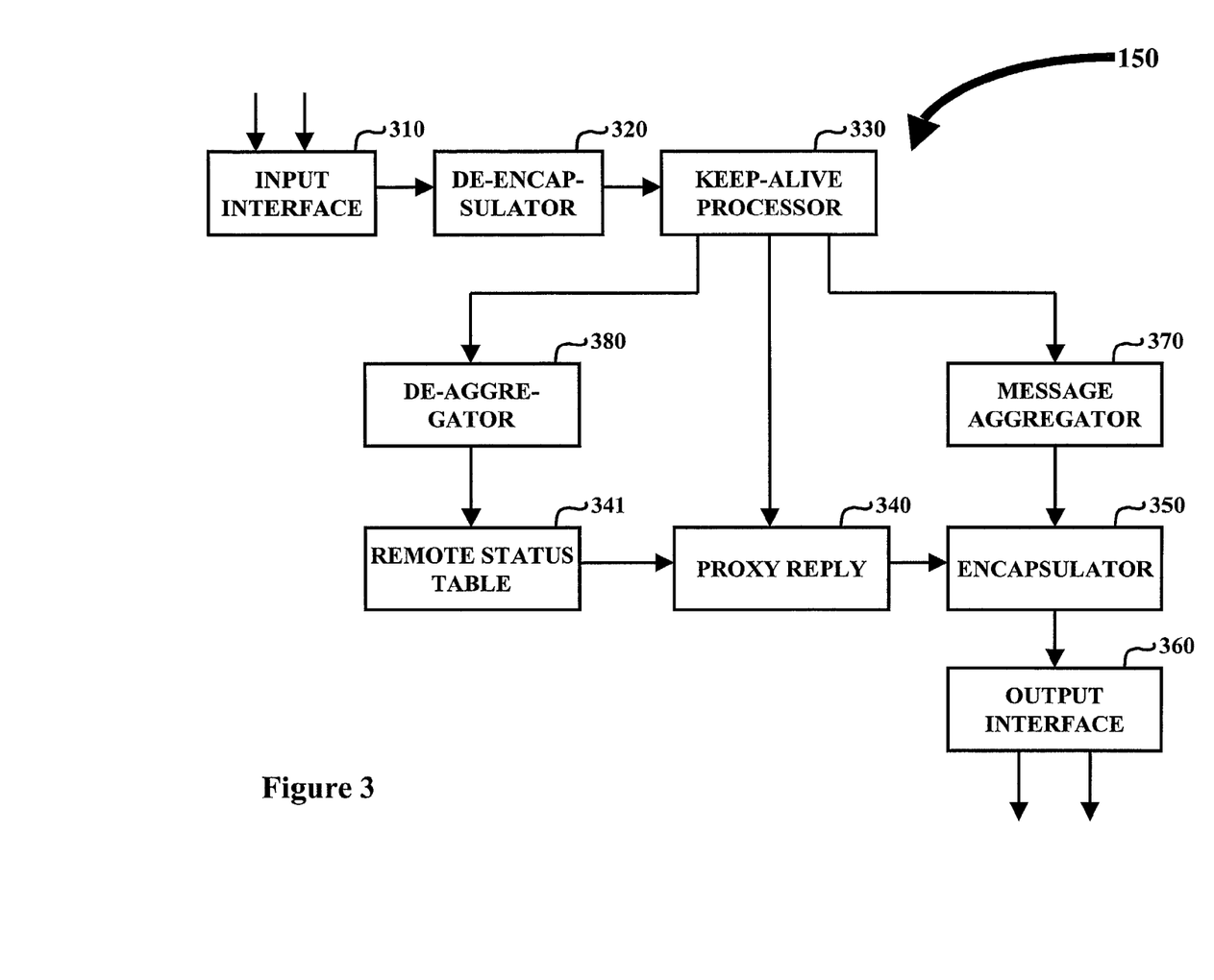
FIG. 3 is a block diagram illustrating the internals of a network access server (NAS) in an embodiment of the present invention.

FIG. 3 is a block diagram illustrating the internals of NAS 150 in an embodiment of the present invention. NAS 150 is shown containing input interface 310, de-encapsulator 320, keep-alive processor 330, proxy reply 340, encapsulator 350, output interface 360, message aggregator 370, and de-aggregator 380. Each component is described below in further detail. The components may be implemented in one or a combination of hardware, software and firmware.

Input interface 310 receives frames/packets from remote systems (110-A through 110-X) and home gateway 170-A. The frames/packets are passed to de-encapsulator 320. De-encapsulator 320 examines the headers to determine whether the packets relate to keep-alive processing, in which case the data in the frames/packets is passed to Keep-alive processor 330.

Keep-alive processor 330 examines the data received from de-encapsulator 320 to determine the manner in which the data is to be processed further. If the data represents an aggregated reply packet, the data is passed to de-aggregator 380. An aggregated reply packet indicates the status of several sessions, and is described in further detail below with reference to FIG. 4.

If the data is received from a remote system and related to keep-alive status checking, keep-alive processor 330 passes the data to message aggregator 370. In addition, keep-alive processor 330 causes proxy reply 340 to generate a status reply message immediately (without having to wait for the status to be checked at the other end of the session). In parallel, message aggregator 370 checks the status of the session(s) as described below.

De-aggregator 380 receives data related to an aggregated reply packet and examines the data to determine the status of different sessions. In an embodiment, each reply packet contains the status of all sessions (identifiers) included in a packet sent by message aggregator 370. Remote status table 341 is updated to reflect the status of the sessions in the received packet. De-aggregator 380 needs to be implemented consistent with the format designed in the implementation of home gateway 170-A. Remote status table 341 may further store a magic number associated with each session.

Proxy reply 340 generates proxy replies to the remote system originating a keep-alive message. The proxy replies may be generated based on the information available in remote status table 341. In an embodiment, a reply that the session is alive/OK is generated when a status request related to a session is received for the first time. Accordingly, remote status table 341 may be initiated with a status of alive/OK when a session is first initiated. It should be appreciated that the end systems are expect to recover from any erroneous status reply given the first time.

Message aggregator 370 receives keep-alive messages received for various sessions, and aggregates several of the messages into a single packet. Only the messages related to sessions terminated at the same peer aggregation device may be aggregated into a packet. That is, one packet may be generated for sessions terminating on home gateway 170-A and another packet may be maintained for packets terminating on home gateway 170-B.

The packet format may be consistent with the description in the previous section on packet format. In one embodiment, each packet contains information for keep-alive messages received in a specific duration (e.g., 10 second interval). That is, a packet may be sent every 10 seconds. However, if sufficient requests are received in a shorter duration, a packet may be initiated ahead of the end of the interval.

Encapsulator 350 encapsulates data consistent with the medium protocol and purpose. For example, when proxy reply 340 is to send a keep-alive response, some of the data may be received from proxy reply 340 and encapsulator 350 may encapsulate the received data for transmission to the remote system (e.g., 110-A) triggering the response. On the other hand, if an aggregated keep-alive message packet is to be transmitted, encapsulator 350 may encapsulate the packet consistent with the protocol (e.g., ATM, Frame Relay or IP) on path 157-A. Output interface 360 transmits the encapsulated packet on the desired path. Output interface 360 and encapsulator 350 may be implemented in a known way.

From the above description, it may be appreciated that NAS 150 sends an aggregated keep-alive message packet and receives an aggregated keep-alive reply (response). NAS 150 stores the status of the sessions as indicated in the response and generates a proxy response based on the stored information. It is further noted that home gateway 170-A is described as generating the aggregated keep-alive reply packet. The manner in which home gateway 170-A may generate the reply packet is described below in further detail:

6. Home Gateway

Figure 4:
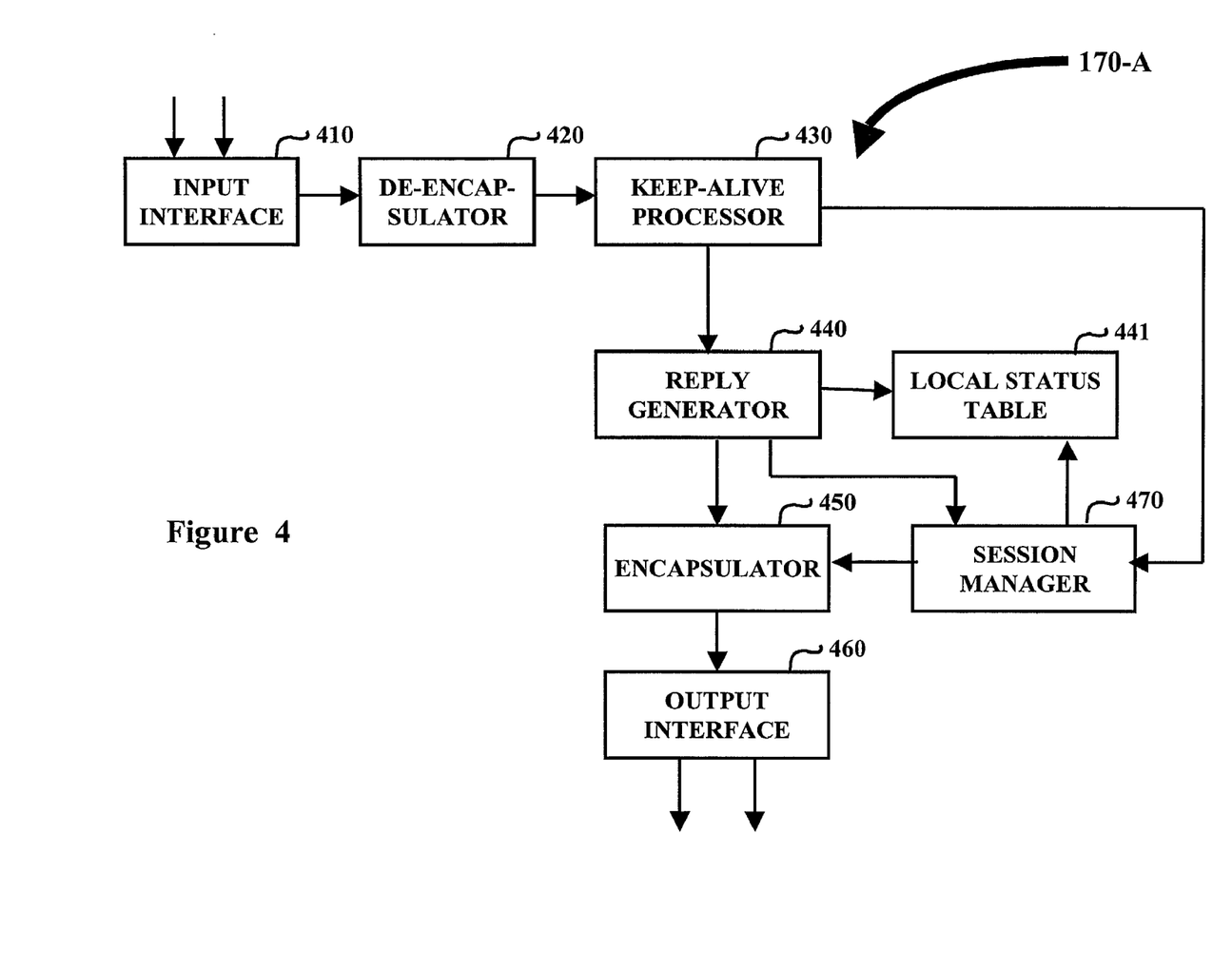
FIG. 4 is a block diagram illustrating the internals of a home gateway in an embodiment of the present invention.

FIG. 4 is a block illustrating the details of home gateway 170-A in one embodiment. Home gateway 170-A is shown containing input interface 410, de-encapsulator 420, keep-alive processor 430, reply generator 440, local status table 441, session manager 470, encapsulator 450, and output interface 460. Each element is described below in further detail.

Where applicable, the elements are described by comparing with similar elements of FIG. 3 for conciseness. Input interface 410, de-encapsulator 420, encapsulator 450, and output interface 460 may be implemented similar to input interface 310, de-encapsulator 320, encapsulator 350, and output interface 360 respectively, but adapted for their specific environments.

Keep-alive processor 430 may also be implemented similar to keep-alive processor 330, except that data and control are passed to reply generator 440 when an aggregate keep-alive message packet is received. Similarly, keep-alive processor 430 passes data and control to session manager 470 when a received packet relates to updating the status of a session.

Session manager 470 updates the content of local state table 441 by determining the status of various sessions having home gateway 170-A as an end-point. Session manager 470 may send the necessary packets using encapsulator 450, and receive the response packets from keep-alive processor 430. The manner in which the status of the sessions may be determined can be implemented in a known way.

Reply generator 440 examines the data in the keep-alive message packet to determine the sessions whose state (status) is requested, and retrieves the corresponding information from local status table 441. Based on the retrieved information, reply generator 440 provides the data forming the reply packet to encapsulator 450, Encapsulator 450 encapsulates the data received from reply generator 440 and sends the aggregate reply packet using output interface 460 to NAS 150. NAS 150 may then process the reply packet as described above with reference to FIG. 3.

7. Software Implementation

Figure 5:
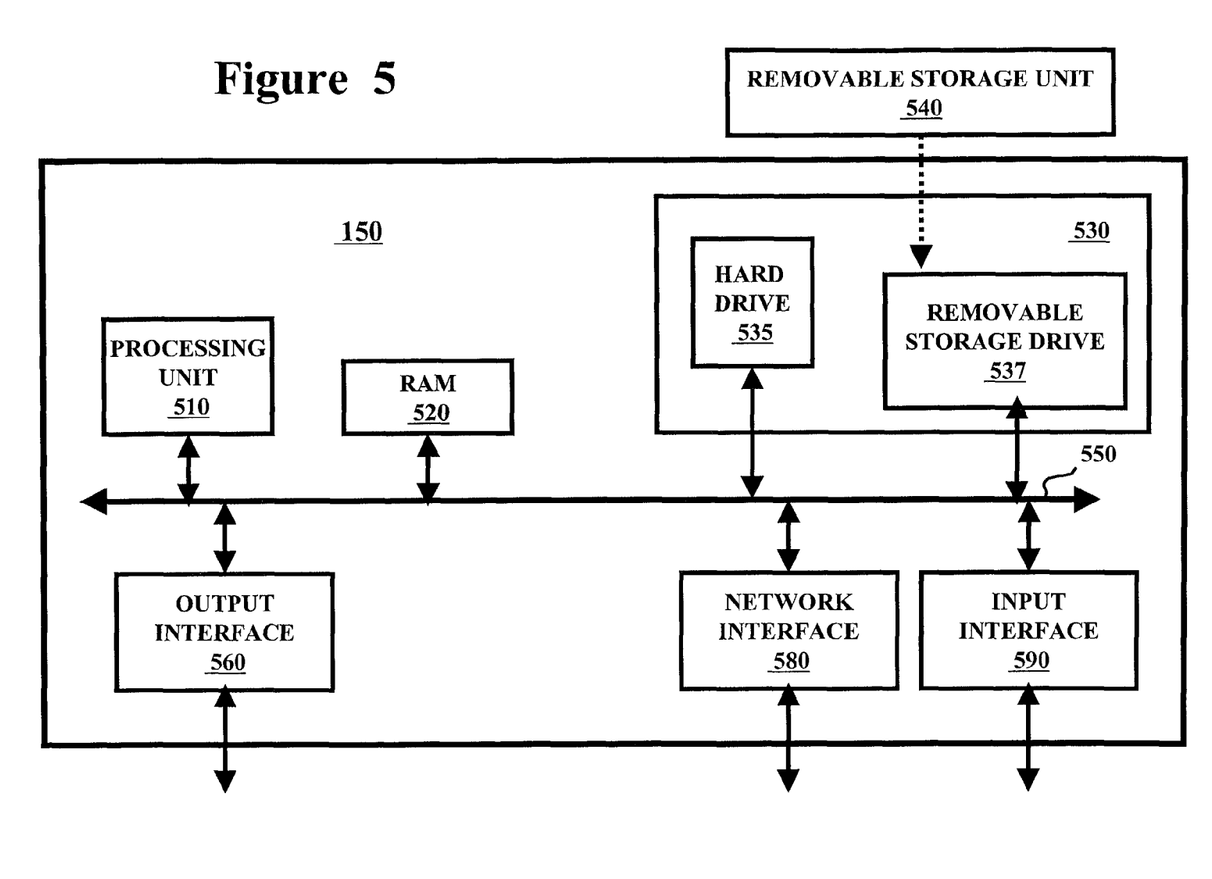
FIG. 5 is a block diagram illustrating an embodiment of the present invention implemented substantially in the form of software.

FIG. 5 is a block diagram illustrating the details of a network device (e.g., NAS 150) in one embodiment. NAS 150 is shown containing processing unit 510, random access memory (RAM) 520, storage 530, output interface 560, network interface 580 and input interface 590. Each component is described in further detail below.

Output interface 560 provides output signals (e.g., display signals to a display unit, not shown) which can form the basis for a suitable user interface for a user to interact with NAS 150. Input interface 590 (e.g., interface with a key-board and/or mouse, not shown) enables a user to provide any necessary inputs to NAS 150. Output interface 560 and input interface 590 can be used, for example, to enable configuration of NAS 150.

Network interface 580 enables NAS 150 to send and receive data on communication networks using protocols as asynchronous transfer mode (ATM). Network interface 580 may correspond to input interface 310 and output interface 360 of FIG. 3. Network interface 580, output interface 560 and input interface 590 can be implemented in a known way.

RAM 520 and storage 530 may together be referred to as a memory. RAM 520 may receive instructions and data on path 550 from storage 530. Storage 530 may contain units such as hard drive 535 and removable storage drive 537. Storage 530 may store the software instructions and data, which enable NAS 150 to provide several features in accordance with the present invention.

Some or all of the data and instructions may be provided on removable storage unit 540, and the data and instructions may be read and provided by removable storage drive 537 to processing unit 510. Floppy drive, magnetic tape drive, CD-ROM drive, DVD Drive, Flash memory, removable memory chip (PCMCIA Card, EPROM) are examples of such removable storage drive 537.

Processing unit 510 may contain one or more processors. Some of the processors can be general purpose processors which execute instructions provided from RAM 520. Some can be special purpose processors adapted for specific tasks (e.g., for memory/queue management). The special purpose processors may also be provided instructions from RAM 520. In general processing unit 510 reads sequences of instructions from various types of memory medium (including RAM 520, storage 530 and removable storage unit 540), and executes the instructions to provide various features of the present invention.

Embodiments according to FIG. 5 can be used to generate aggregate request packets and aggregate reply packets as described above. Thus, the present invention provides an efficient way to process keep-alive messages received from end systems.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method comprising:
    receiving in an aggregation device a plurality of keep-alive messages in a communication network;
    sending an aggregated request packet which includes data indicating that a plurality of statuses of point to point (PPP) sessions is requested;
    receiving an aggregated reply packet from a peer aggregation device, wherein the aggregated reply packet includes information indicating a respective statuses of at least some of the plurality of PPP sessions, wherein content of a local status table is updated with the respective statuses of the at least some of the plurality of PPP sessions;
    maintaining the local status table in said aggregation device, wherein said local status table indicates current statuses of sessions supported by said aggregation device;
    updating said local status table with the information in said aggregated reply packet; and
    generating a proxy keep-alive reply according to said local status table.

2. The method of claim 1, further comprising:
    receiving said aggregated request packet in said peer aggregation device; and
    sending said aggregated reply packet to said aggregation device.

3. The method of claim 1, wherein a proxy keep-alive message indicates that a corresponding session is alive/OK when a first keep-alive message is received for the corresponding session.

4. The method of claim 1, wherein said communication network is implemented using one of frame relay, ATM and IP networks.

5. The method of claim 1, wherein said aggregation device is one of a network access server and home gateway.

6. The method of claim 1, wherein said aggregation device is physically separate from said plurality of end systems.

7. The method of claim 1, wherein said generating includes less data in said aggregated request packet than data forming said plurality of keep-alive messages together.

8. The method of claim 7, wherein each of said plurality of keep-alive messages contains an identifier of a corresponding PPP session, wherein said generating comprises:
    selecting said identifier of each of said plurality of keep-alive messages; and
    forming said aggregated request packet, wherein said aggregated request packet contains less data than said plurality of keep-alive messages together.

9. The method of claim 1, wherein each of said PPP sessions terminates at a home gateway, and wherein said aggregation device comprises a switching device and is in the path of each of said PPP sessions from a corresponding one of said plurality of end systems to said home gateway.

10. The method of claim 1, wherein said receiving, said generating and said sending are performed in an aggregation device implemented as a single device.

11. A method comprising:
    examining an aggregated request packet to determine that a plurality of statuses of a plurality of point-to-point sessions is requested;
    determining the plurality of statuses of each of said plurality of point-to-point (PPP) sessions;

generating an aggregated reply packet indicating the plurality of statuses of said plurality of point-to-point sessions; and sending said aggregated reply packet to a peer aggregation device, wherein the aggregated reply packet including information indicating respective statuses of at least some of the plurality of PPP sessions, wherein content of a remote status table is updated with the respective statuses of the at least some of the plurality of PPP sessions, wherein a local status table is maintained and indicates current statuses of sessions supported by the aggregation device, and wherein the local status table is updated with the information in the aggregated reply packet, and wherein a proxy keep-alive reply message is generated according to the local status table.

12. The method of claim 11, wherein said generating comprises including a client magic number associated with each of said plurality of point-to-point sessions.

13. The method of claim 11, wherein said generating comprises setting a bit to one logical value to indicate that a corresponding one of said plurality of sessions is OK/alive.

14. The method of claim 11, wherein said aggregation device comprises one of a network access server (NAS) and a home gateway implemented in a communication network.

15. The method of claim 11, wherein said aggregation device is physically separate from said plurality of end systems.

16. The method of claim 11, wherein said examining, said determining, said generating and said sending are performed in said aggregation device implemented as a single device.

17. An aggregation device for processing a plurality of keep-alive messages generated by a corresponding plurality of end systems, comprising:

an input interface receiving said plurality of keep-alive messages;

a message aggregator coupled to said input interface, said message aggregator examining said plurality of messages and generating data according to a format indicating that a plurality of statuses of point to point (PPP) sessions is requested;

an output interface sending an aggregated request packet on a communication network to a peer aggregation device, said aggregated request packet containing said data generated by said message aggregator, wherein the aggregation device is further configured to receive an aggregated reply packet from the peer aggregation device, wherein the aggregated reply packet includes information indicating respective statuses of at least some of the plurality of PPP sessions, wherein content of a local status table is updated with the respective statuses of the at least some of the plurality of PPP sessions;

an encapsulator encapsulating said data in a packet suitable for transmission on said communication network; and a de-aggregator configured to receive the aggregated reply packet from said peer aggregation device, wherein said aggregated reply packet includes information indicating the respective statuses of the at least some of said plurality of PPP sessions, said de-aggregator updating said remote status table with the information in said aggregated reply packet.

18. The aggregation device of claim 17, further comprising a proxy reply unit sending a proxy keep-alive reply message to one of said plurality of end systems originating a corresponding one of said keep alive-messages without waiting for said aggregated reply packet.

19. The aggregation device of claim 18, wherein said aggregation device comprises a network access server.

20. An aggregation device for processing a plurality of keep-alive messages generated by a corresponding plurality of end systems, comprising:

means for receiving said plurality of keep-alive messages;

means for generating an aggregated request packet which includes data indicating that a plurality of statuses of point to point (PPP) sessions is requested;

means for sending said aggregated request packet to a peer aggregation device; means for receiving an aggregated reply packet from the peer aggregation device, wherein the aggregated reply packet includes information indicating respective statuses of at least some of the plurality of PPP sessions, wherein content of a local status table is updated with the respective statuses of the at least some of the plurality of PPP sessions;

means for maintaining the local status table in said aggregation device, wherein said local status table indicates current statuses of sessions supported by said aggregation device;

means for updating said local status table with the information in said aggregated reply packet; and means for generating a proxy keep-alive reply according to said local status table.

21. The aggregation device of claim 20, wherein said means for generating includes less data in said aggregated request packet than data forming said plurality of keep-alive messages together.

22. The aggregation device of claim 21 wherein each of said plurality of keep-alive messages contains an identifier of a corresponding PPP session, wherein said means for generating operates to:

select said identifier of each of said plurality of keep-alive messages; and form said aggregated request packet, wherein said aggregated request packet contains less data than said plurality of keep-alive messages together.

23. The aggregation device of claim 20, wherein each of said PPP sessions terminates at a home gateway, and wherein said aggregation device comprises a switching device and is in the path of each of said PPP sessions from a corresponding one of said plurality of end systems to said home gateway.

24. The aggregation device of claim 20, wherein said means for receiving, said means for generating and said means for sending are contained in said aggregation device implemented as a single device.

25. An aggregation device for processing an aggregated request packet, wherein said aggregated request packet is received from a peer aggregation device and indicates that a plurality of statuses of a plurality of point-to-point sessions are requested, said aggregation device comprising:

means for examining said aggregated request packet to determine that the plurality of statuses of said plurality of point-to-point sessions is requested;

means for determining the plurality of statuses of each of said plurality of point-to-point sessions;

means for generating an aggregated reply packet indicating the plurality of statuses of said plurality of point-to-point sessions;

means for sending said aggregated reply packet to said peer aggregation device, wherein the aggregated reply packet includes information indicating respective statuses of at least some of the plurality of PPP sessions, wherein content of a remote status table is updated with the respective statuses of the at least some of the plurality of PPP sessions, wherein a local status table is maintained and indicates current statuses of sessions supported by the aggregation device, and wherein the local status table is updated with the information in the aggregated reply packet, and wherein a proxy keep-alive reply message is generated according to the local status table.

26. The aggregation device of claim 25, wherein said means for generating includes a client magic number associated with each of said plurality of point-to-point sessions.

27. The aggregation device of claim 25, wherein said means for generating sets a bit in said aggregated reply packet to one logical value to indicate that a corresponding one of said plurality of sessions is OK/alive.

28. The aggregation device of claim 25, wherein said aggregation device comprises one of a network access server (NAS) and a home gateway implemented in a communication network.

29. The aggregation device of claim 25, wherein said means for examining, said means for determining, said means for generating and said means for sending are implemented in said aggregation device implemented as a single device.

30. An aggregation device for processing an aggregated request packet, wherein said aggregated request packet is received from a peer aggregation device and indicates that a plurality of statuses of a plurality of point-to-point sessions are requested, said aggregation device comprising:
an input interface configured for receiving said aggregated request packet;
a de-encapsulator configured for examining said aggregated request packet to determine that the plurality of statuses of said plurality of point-to-point (PPP) sessions is requested;
a reply generator configured for determining the plurality of statuses of each of said plurality of point-to-point sessions, and generating an aggregated reply packet including information indicating the plurality of statuses of each of said plurality of point-to-point sessions; and
an output interface configured for sending said aggregated reply packet to said peer aggregation device, wherein content of a local status table is updated with the status of the PPP sessions, wherein the local status table indicates current statuses of particular sessions supported by the aggregation device, and wherein the local status table is updated with the information in the aggregated reply packet, and wherein a proxy keep-alive reply message is generated according to the local status table.

31. The aggregation device of claim 30, further comprising a session manager configured for updating said local status table.

32. The aggregation device of claim 30, wherein said reply generator includes in said aggregated reply packet a client magic number associated with each of said plurality of point-to-point sessions.

33. The aggregation device of claim 30, wherein said reply generator sets a bit in said aggregated reply packet to one logical value to indicate that a corresponding one of said plurality of sessions is OK/alive.

34. The aggregation device of claim 30, further comprising a keep-alive processor coupled to said de-encapsulator, wherein said keep-alive processor examines said aggregated request packet to determine that status of point-to-point sessions is requested and causes said reply generator to generate said aggregated reply packet.

35. The aggregation device of claim 30, wherein said aggregation device comprises one of a network access server (NAS) and a home gateway implemented in a communication network.

36. The aggregation device of claim 30, wherein said reply generator includes less data in said aggregated request packet than data forming said plurality of keep-alive messages together.

37. The aggregation device of claim 36, wherein each of said plurality of keep-alive messages contains an identifier of a corresponding PPP session, wherein said reply generator operates to:
select said identifier of each of said plurality of keep-alive messages; and
form said aggregated request packet, wherein said aggregated request packet contains less data than said plurality of keep-alive messages together.

38. The aggregation device of claim 30, wherein each of said PPP sessions terminates at a home gateway, and wherein said aggregation device comprises a switching device and is in the path of each of said PPP sessions from a corresponding one of said plurality of end systems to said home gateway.

39. The aggregation device of claim 30, wherein said input interface, said de-encapsulator, said reply generator and said output interface are contained in said aggregation device implemented as a single device.

40. A non-transitory medium including one or more sequences of instructions, wherein execution of said one or more sequences of instructions by one or more processors causes the actions of:
receiving in an aggregation device a plurality of keep-alive messages;
generating in said aggregation device an aggregated request packet which includes data indicating that a plurality of statuses of PPP sessions is requested;
receiving an aggregated reply packet from a peer aggregation device, wherein the aggregated reply packet includes information indicating respective statuses of at least some of the plurality of PPP sessions, wherein content of a local status table is updated with the respective statuses of the at least some of the plurality of PPP sessions;
updating said remote status table with the information in said aggregated reply packet; and
generating a proxy keep-alive reply according to said remote status table.

41. The medium of claim 40, wherein said generating includes less data in said aggregated request packet than data forming said plurality of keep-alive messages together.

42. The medium of claim 41, wherein each of said plurality of keep-alive messages contains an identifier of a corresponding PPP session, wherein said generating comprises:
selecting said identifier of each of said plurality of keep-alive messages; and
forming said aggregated request packet, wherein said aggregated request packet contains less data than said plurality of keep-alive messages together.

43. The medium of claim 40, wherein each of said PPP sessions terminates at a home gateway, and wherein said aggregation device comprises a switching device and is in the path of each of said PPP sessions from a corresponding one of said plurality of end systems to said home gateway.

44. The medium of claim 40, wherein said receiving, said generating and said sending are performed by said aggregation device implemented as a single device.

45. A non-transitory medium including one or more sequences of instructions, wherein execution of said one or more sequences of instructions by one or more processors causes the actions of:

examining said aggregated request packet to determine that a plurality of statuses of a plurality of point-to-point sessions is requested;

determining the plurality of statuses of each of said plurality of point-to-point sessions;

generating an aggregated reply packet indicating the plurality of statuses of said plurality of point-to-point sessions;

sending said aggregated reply packet to a peer aggregation device; and receiving the aggregated reply packet from the peer aggregation device, wherein the aggregated reply packet includes information indicating respective statuses of at least some of the plurality of PPP sessions, wherein content of a local status table is updated with the respective statuses of the at least some of the plurality of PPP sessions, wherein the local status table indicates current statuses of sessions supported by the aggregation device, and wherein the local status table is updated with the information in the aggregated reply packet, and wherein a proxy keep-alive reply message is generated according to the local status table.

46. The medium of claim 45, wherein said generating comprises including a client magic number associated with each of said plurality of point-to-point sessions.

47. The medium of claim 45, wherein said generating comprises setting a bit to one logical value to indicate that a corresponding one of said plurality of sessions is OK/alive.

48. The medium of claim 45, wherein said aggregation device comprises one of a network access server (NAS) and a home gateway implemented in a communication network.

49. The medium of claim 45, wherein said examining, said determining, said generating and said sending are performed by said aggregation device implemented as a single device.

50. A system, comprising:

a first aggregation device receiving a plurality of keep-alive messages generated by a corresponding plurality of end systems, each of said plurality of keep-alive messages being designed to request a plurality of statuses of a plurality of point to point (PPP) session implemented on a communication network, said first aggregation device generating an aggregated request packet which includes data indicating that the plurality of statuses of said plurality of PPP sessions is requested, and sending said aggregated request packet; and a peer aggregation device receiving said aggregated request packet including information indicating the plurality of statuses of said plurality of PPP sessions in an aggregated reply packet, said peer aggregation packet sending said aggregated reply packet to said first aggregation device, wherein content of a local status table is updated with the plurality of statuses of the plurality of PPP sessions, wherein the local status table indicates current statuses of sessions supported by the first aggregation device, and wherein the local status table is updated with the information in the aggregated reply packet, and wherein a proxy keep-alive reply message is generated according to the local status table.

51. The system of claim 50, wherein said first aggregation device is located at an edge of the communication network.

52. The system of claim 51, further comprising an access network coupling said first aggregation device to said corresponding plurality of end systems, wherein said plurality of keep-alive messages are received on said access network.

53. The system of claim 52, wherein said first aggregation device and said peer aggregation device respectively comprise a network access server (NAS): and a home gateway.

* * * * *